(12) United States Patent
Blot et al.

(10) Patent No.: US 8,852,495 B2
(45) Date of Patent: Oct. 7, 2014

(54) METHOD FOR PRODUCING A COMPONENT MADE OF A COMPOSITE MATERIAL AND ASSOCIATED DEVICE

(75) Inventors: Philippe Blot, Nantes (FR); Sébastien Gohier, La Montagne (FR); Mathieu Lannuzel, Saint Herblain (FR)

(73) Assignee: Airbus Operations SAS, Toulouse (FR)

( * ) Notice: Subject to any disclaimer, the term of this patent is extended or adjusted under 35 U.S.C. 154(b) by 804 days.

(21) Appl. No.: 13/058,043

(22) PCT Filed: Aug. 6, 2009

(86) PCT No.: PCT/FR2009/051562
§ 371 (c)(1),
(2), (4) Date: Mar. 25, 2011

(87) PCT Pub. No.: WO2010/015783
PCT Pub. Date: Feb. 11, 2010

(65) Prior Publication Data
US 2011/0180960 A1 Jul. 28, 2011

(30) Foreign Application Priority Data
Aug. 8, 2008 (FR) ..................................... 08 55498

(51) Int. Cl.
*B29C 45/14* (2006.01)
*B29C 70/44* (2006.01)
*B29K 105/24* (2006.01)

(52) U.S. Cl.
CPC ......... *B29C 70/443* (2013.01); *B29K 2105/246* (2013.01); *B29C 2791/006* (2013.01)
USPC ............ 264/511; 264/257; 425/117; 425/388

(58) Field of Classification Search
CPC ..................................................... B29C 70/548
USPC .......................... 264/511, 257; 425/117, 388
See application file for complete search history.

(56) References Cited

U.S. PATENT DOCUMENTS 4,942,013 A * 7/1990 Palmer et al. ................. 264/511
(Continued)

OTHER PUBLICATIONS

Campbell, Flake C Jr., Manufacturing Processes for Advanced Composites, 2003, 2 pgs, from google books (caul plate thickness).*

(Continued)

*Primary Examiner* — Yogendra Gupta
*Assistant Examiner* — Kimberly A Stewart
(74) *Attorney, Agent, or Firm* — Young & Thompson

(57) ABSTRACT

A process for manufacturing a piece made of composite material including a fiber preform that is embedded in a matrix, includes placing the preform in a first chamber that is delimited by a first semi-sealed wall, i.e., permeable to gas and impermeable to a product that is able to form the matrix, extracting the gases in a second chamber that is delimited by a second gas-tight wall and the first semi-sealed wall so as to obtain the diffusion of the product that is able to form the matrix in the preform, characterized in that it consists in using—as a first semi-sealed wall—at least one plate with a number of pipes of tapered shape that empty on either side of the at least one plate and at least one semi-sealed membrane that is superposed on the at least one plate.

13 Claims, 1 Drawing Sheet

(56) References Cited

U.S. PATENT DOCUMENTS

| | | | |
|---|---|---|---|
| 5,702,663 A * | 12/1997 | Seemann | 264/510 |
| 2004/0219244 A1* | 11/2004 | Filsinger et al. | 425/116 |
| 2005/0281980 A1* | 12/2005 | Cruz et al. | 428/131 |

OTHER PUBLICATIONS

"Maufactoring Processes for Advanced Composites", Ply Collection: A Major Cost Driver, pp. 162-171, XP 002517863.

* cited by examiner

U.S. Patent
Oct. 7, 2014
US 8,852,495 B2
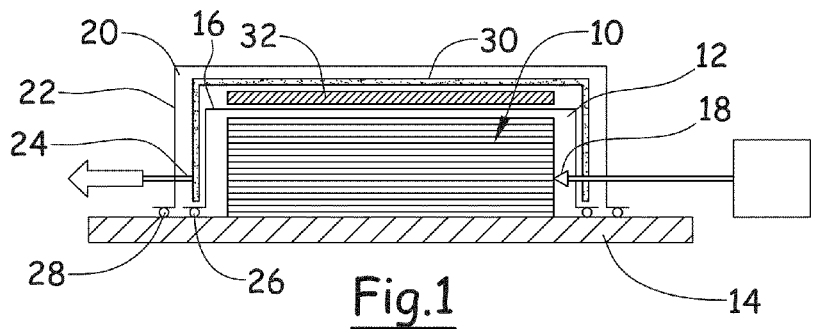
Fig.1
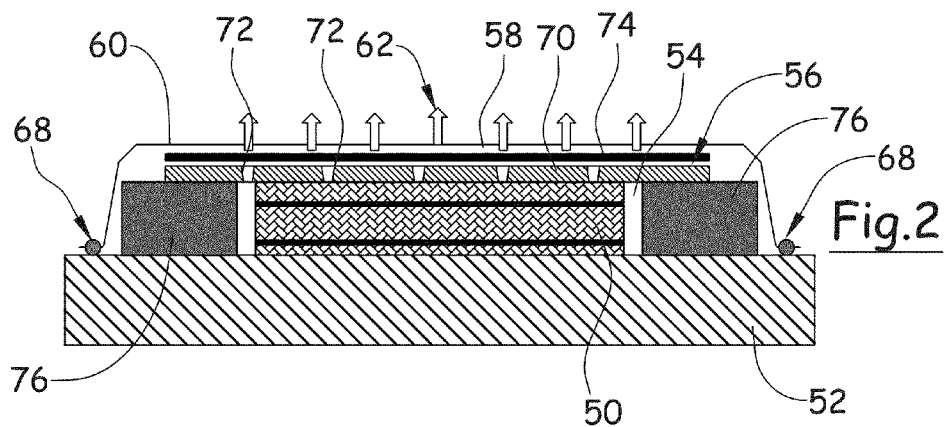
Fig.2
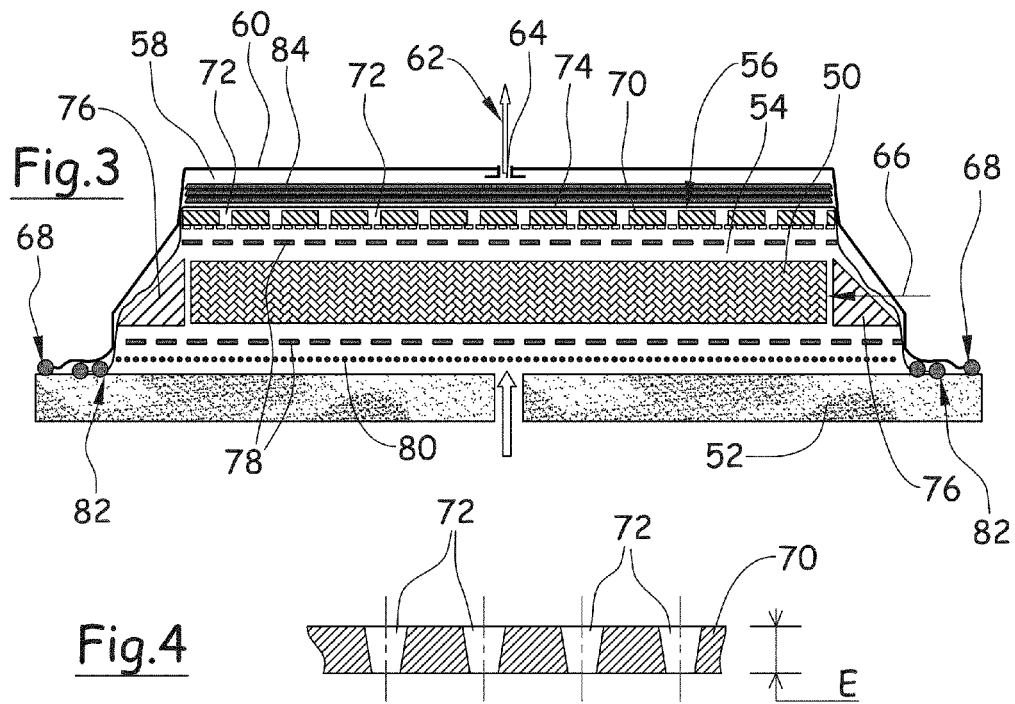
Fig.3
Fig.4

METHOD FOR PRODUCING A COMPONENT MADE OF A COMPOSITE MATERIAL AND ASSOCIATED DEVICE

BACKGROUND OF THE INVENTION

1. Field of the Invention

This invention relates to a process for manufacturing a piece made of composite material and more particularly a process and a device whose purpose is to ensure a homogeneous impregnation of a fiber preform by injection or infusion of a product that is able to form a matrix.

2. Description of the Related Art

The pieces made of a composite material comprise a matrix, for example made of resin, reinforced by fibers. According to one widely used embodiment, the fibers come in the form of a fiber preform, with one or more fold(s) that are woven or not and pre-impregnated or not.

Prior to the polymerization phase, the product that forms the matrix is to impregnate this preform homogeneously to obtain a piece that has optimal characteristics.

According to a first operating mode, referred to as injection, the product that forms the matrix, generally resin, is injected into the preform at one or more points and even over the entire surface of the preform, optionally with a diffusion medium.

According to another operating mode, referred to as infusion, the product that forms the matrix is integrated in the preform and comes in the form of, for example, one or more inserted resin film(s) or film(s) placed side by side with folds that form said preform.

To implement this impregnation, a device as described in particular in the documents US2004/0219244 or US2005/0031720 and illustrated in FIG. 1 is used.

According to this document, the preform 10 is placed in a first chamber 12 that is delimited by a substrate 14 and a first semi-sealed membrane 16, i.e., permeable to gas but sealed to the product that is able to form the matrix, whereby at least one feed point 18 is provided in said first chamber 12.

In addition, the device comprises a second chamber 20 that is delimited, on the one hand, by a second gas-tight membrane 22, and, on the other hand, by the first semi-sealed membrane 16, whereby said chamber 20 comprises at least one opening 24 for extracting the gases that are contained in said second chamber 20 and thus drawing in the gases that are present in said first chamber 12.

The intake of gases into the first chamber 12 produces the diffusion of the product that is able to form the matrix in the entire preform.

Thus, during the infusion or injection phase, the first semi-sealed membrane 16 ensures an optimum filling and degassing of the preform without drawing in the product that is able to form the matrix.

Sealing means 26 are provided to ensure the seal between the substrate 14 and the first semi-sealed membrane 16 as well as sealing means 28 between the substrate 14 and the second sealed membrane 22.

In addition, a draining fabric 30 can be placed in the second chamber so as to promote the evacuation of gases.

To obtain the smoothing of the surface of the preform that is in contact with the first semi-sealed wall 16, a smoothing plate 32 can be used and placed in the second chamber 20, inserted between the draining fabric and the first semi-sealed wall 16. Taking into account its function, this smoothing plate 32 is solid and does not comprise any through opening. It also makes it possible to homogenize the pressure forces on the preform.

According to one embodiment, the semi-sealed membrane 16 consists of a microporous fabric, whereby the small diameter of the pores makes possible the passage of gases but blocks the passage of viscous fluids such as the product that is able to form the matrix.

During the polymerization, the product that is able to form the matrix tends to solidify and to block the pores at the surface that have been in contact with the piece that is produced although the membrane made of microporous fabric is disposable.

According to one problem, whereby the microporous fabrics exist only in limited width, the large pieces have surface defects at junction zones of the bands of microporous fabrics.

According to another problem, the microporous fabrics are not very deformable; their installations on surfaces that cannot be developed can prove problematical and lead to generating folds that produce surface defects at the piece that is produced.

According to another problem, when the membrane 16 made of microporous fabric is applied on zones with small curvature radii, this tends to deform the pores and to increase their dimensions, leading to a loss of seal on the part of the product that is able to form the matrix facing said zones.

Finally, the product that forms the matrix tends to stick to the membrane 16 made of microporous fabric and makes it necessary to use a peelable film called "peel ply" that tends to generate surface defects at the piece that is produced.

The surface defects at the piece are reflected by decreased mechanical characteristics, due to the undulations of fibers, but also by decreased aerodynamic characteristics when the surface of the piece that is produced corresponds to the outside surface of an aircraft fuselage.

In addition, these surface defects do not promote the monitoring of pieces thus produced, in particular the detection of cracks and porosity, by wave reflection techniques, generally used in the aeronautical industry.

SUMMARY OF THE INVENTION

Also, the purpose of this invention is to remedy the drawbacks of the prior art by proposing a process and a device for producing a piece made of composite material from a fiber preform that is embedded in a matrix by injection or infusion of a product that is able to form said matrix, making it possible to reduce the production costs and to optimize the characteristics of the thus produced piece.

For this purpose, the invention has as its object a process for manufacturing a piece made of composite material comprising a fiber preform that is embedded in a matrix, consisting in placing said preform in a first chamber that is delimited by a first semi-sealed wall, i.e., permeable to gas and impermeable to a product that is able to form the matrix, extracting the gases in a second chamber that is delimited by a second gas-tight wall, and said first semi-sealed wall so as to obtain the diffusion of the product that is able to form the matrix in the preform, characterized in that it consists in using—as a first semi-sealed wall—at least one plate with a number of pipes of tapered shape that empty on either side of said at least one plate and at least one semi-sealed membrane that is superposed on said at least one plate.

BRIEF DESCRIPTION OF THE DRAWING FIGURES

Other characteristics and advantages will emerge from the following description of the invention, a description that is provided only by way of example, relative to the accompanying drawings, in which:

FIG. 1 is a cutaway view that diagrammatically illustrates a device according to the prior art, FIG. 2 is a cutaway view that diagrammatically illustrates a device according to a simplified variant of the invention for producing a piece made of composite material from a fiber preform that is embedded in a matrix by injection or infusion of a product that is able to form said matrix, FIG. 3 is a cutaway view that diagrammatically illustrates a device according to another variant of the invention, and FIG. 4 is a cutaway view that illustrates in detail the openings of a plate that forms a portion of a semi-sealed wall.

DETAILED DESCRIPTION OF THE INVENTION

At 50, FIGS. 2 and 3 show at least one fiber preform that is designed to be embedded in a matrix, for example a resin, so as to obtain, after polymerization, a piece made of composite material that forms a piece of an aircraft. However, the process of the invention is not limited to the aeronautical field.

According to the variants, the preform can be obtained by stacking folds of fibers or by assembling panels of fibers, whereby the fibers may or may not be impregnated and are arranged according to an organized or random arrangement.

The preform is not described in more detail because it is known to one skilled in the art and can have various shapes, and can consist of fibers of various natures.

The matrix is produced from a product that can be fluid in a first state and can be solid in a second state. By way of example, the matrix is formed by resin.

The product that is able to form the matrix is not described in more detail because it is known to one skilled in the art and can vary based on the desired characteristics.

The purpose of this invention is to propose a process and an associated device making it possible to embed the fiber preform in a product that is able to form the matrix by diffusing said product in the preform.

According to a first operating mode, referred to as injection, the production that is able to form the matrix can be injected into the preform and can come from a distant reservoir of the preform, as illustrated in FIG. 3.

According to another operating mode, referred to as infusion, the product that is able to form the matrix can be stored in solid form in the preform, for example in the form of at least one film, as illustrated in FIG. 2.

The device for manufacturing a piece made of composite material comprises a substrate 52 on which the preform 50 rests directly or not, a first chamber 54 in which the preform 50 is placed and which is delimited by said substrate 52, and a first semi-sealed wall 56, i.e., permeable to gas and impermeable to the product that is able to form the matrix, a second chamber 58 that is delimited by a second gas-tight wall 60 and said first semi-sealed wall 56, as well as means 62 for extracting the gases from the second chamber 58.

The substrate 52 may or may not be flat. In general, it has shapes adapted to those of the piece to be produced that is in contact with said substrate 52. The substrate is not presented in more detail because it is known to one skilled in the art and can have various configurations based in particular on the piece to be produced.

The means 62 for extracting the gases comprise at least one pipe that communicates with the second chamber 58 via at least one opening 64. These means 62 are not described in more detail because they are known to one skilled in the art.

In the case of an operating mode by injection, the device comprises at least one product feed 66 that is able to form the matrix that empties into the first chamber 54 via at least one opening. This feed is not presented in more detail because it is known to one skilled in the art and can have different configurations based in particular on the product that is able to form the matrix and/or the piece to be produced.

The second wall 60 that is gas-tight can come in the form of a flexible and sealed membrane, like the devices of the prior art.

According to one embodiment, the second wall 60 that is gas-tight covers all of the other elements of the device and comprises on the periphery a contact zone with the substrate 52, whereby sealing means 68 are advantageously provided for ensuring the seal between said second wall 60 and said substrate 52.

This second wall is not presented in more detail because it is known to one skilled in the art.

According to the invention, the first semi-sealed wall 56 comprises at least one plate 70 with pipes 72 that empty on either side of said at least one plate 70 and at least one semi-sealed membrane 74 that is superposed on said at least one plate 70.

This combination of at least one semi-sealed membrane 74 and at least one perforated or microperforated plate 70 makes it possible to obtain an intake of surface-type gases and therefore to obtain a better degassing of the preform and consequently a better diffusion of the product that is able to form the matrix contrary to the prior art that uses a non-perforated smoothing panel.

According to one embodiment, the pipes 72 are obtained by perforation or microperforation.

This plate 70 with through pipes 72 makes it possible not only to smooth the surface of the piece to be produced that is in contact with said plate in the manner of a smoothing panel of the prior art, but it also makes it possible to extract the gases from the first chamber 54 so as to ensure the diffusion of the product that is able to form the matrix in the entire preform 50.

Contrary to a non-perforated smoothing panel of the prior art for which the extraction is performed on the periphery of the panel, the plate 70 with through pipes 72 makes possible a surface-type extraction and a better diffusion of the product that is able to form the matrix in the preform, which contributes to improving the characteristics of the thus produced piece.

The cross-section of the pipes 72 is adapted in particular to the pressure that is exerted on the piece to be produced so as not to mark the piece. Thus, the cross-section of the pipes 72 is inversely proportional to the pressure that is exerted.

The pipes can be provided over the entire plate 70 or only over at least one zone.

The distribution of the pipes 72 may or may not be homogeneous.

The plate 70 can cover the entire preform or only a portion of the preform 50. As a variant, the semi-sealed wall 56 can comprise several juxtaposed plates 70.

The plate 70 can be flat or have shapes that are adapted to the piece to be produced.

The plate 70 can be metallic or made of another more or less rigid material.

Preferably, its thickness E varies between 0.1 mm and 25 mm.

As appropriate, the plate 70 can rest on the periphery against at least one edge shim 76 that is arranged on the periphery of the preform for obtaining a better calibration of the piece to be produced.

Based on its material and the product that is able to form the matrix, the surface of the plate 70 that is in contact with the piece to be produced can comprise an anti-adhesive coating or can be coated with a demolding agent.

According to another characteristic of the invention, when the plate 70 is relatively thick, with a thickness E that is greater than or equal to approximately 10 mm, the pipes 72 are tapered so as to promote the demolding of said pipes after polymerization of the product that is able to form the matrix. This characteristic makes it possible to be able to reuse the plate 70, which contributes to reducing the production costs.

According to one embodiment that is illustrated in FIG. 4, the pipes 72 are tapered to promote the demolding.

Preferably, to limit the marking of the product that is able to form the matrix in the second chamber 58, the pipes 72 are tapered, with the small cross-section being oriented toward the first chamber 54 and the large cross-section being oriented toward the second chamber 58.

According to one embodiment, the membrane 74 consists of a microporous fabric, for example, a GORE-TEX® (porous fluorine containing polymer)-type fabric.

According to an important characteristic of the invention, the semi-sealed membrane 74 is arranged beside the surface of the plate 70 that is opposite to the one that is in contact with the piece to be produced.

Thus, the semi-sealed membrane 74 can only be in contact with the product that is able to form the matrix over a small surface area corresponding to those of the through pipes 72.

The membrane 60 thus makes it possible to flatten the membrane 74 on the plate 70 against the edge shims 76 and the latter against the substrate 52, which contributes to ensuring a seal between these various elements.

In addition, the device can comprise fabrics 78 to be delaminated on either side of the preform so as to promote the demolding of the piece that is produced as well as a netting with an anti-adhesive coating 80 that is in direct contact with the substrate 52 to promote the diffusion of the product that is able to form the matrix before injection into the preform.

Sealing means 82 are provided to ensure the seal between the substrate 52 and said semi-sealed membrane 74.

In addition, a draining fabric 84 can be placed in the second chamber 58 so as to promote the evacuation of gases, preferably inserted between the second wall 60 and the semi-sealed membrane 74.

The invention claimed is:

1. A process for manufacturing a piece made of composite material comprising a fiber preform that is embedded in a matrix, comprising:
    placing said preform in a first chamber that is delimited by a first semi-sealed wall which is permeable to gas and impermeable to a product that is able to form the matrix, the first semi-sealed wall comprising at least one sealed plate having a plurality of tapered pipes that empty on either side of the at least one sealed plate, a cross section of the plurality of tapered pipes being adapted so that pressure being exerted on the piece does not mark the piece, the cross section of the plurality of tapered pipes having a small cross section that is oriented toward the first chamber in a direction of the pressure exerted on the piece, the first semi-sealed wall also comprising at least one semi-sealed membrane that is superposed on said at least one plate, the semi-sealed membrane being arranged on a side of a surface of the plate opposite to a side that is in contact with the piece to be produced; and
    extracting gases in a second chamber that is delimited by a second gas-tight wall and said first semi-sealed wall so as to obtain the diffusion of the product that is able to form the matrix in the preform.

2. The process for manufacturing a piece made of composite material according to claim 1, wherein at least one edge shim is on a periphery of the preform on which the plate rests.

3. A device for manufacturing a piece made of composite material that comprises a fiber preform that is embedded in a matrix, comprising:
    a first chamber into which the preform is placed and which is delimited by a first semi-sealed wall permeable to gas and impermeable to a product that is able to form the matrix, the first semi-sealed wall comprising at least one sealed plate having a plurality of tapered pipes that empty on either side of the at least one sealed plate, a cross section of the plurality of tapered pipes being adapted so that pressure being exerted on the piece does not mark the piece, the cross section of the plurality of tapered pipes having a small cross section that is oriented toward the first chamber in a direction of the pressure exerted on the piece, the first semi-sealed wall also comprising at least one semi-sealed membrane that is superposed on said at least one plate, the semi-sealed membrane being arranged on a side of a surface of the plate opposite to a side that is in contact with the piece to be produced;
    a second chamber that is delimited by a second gas-tight wall and said first semi-sealed wall; and
    a gas extractor configured for extracting gases from the second chamber.

4. The device for manufacturing a piece made of composite material according to claim 3, wherein at least one edge shim is on a periphery of the preform on which the plate rests.

5. The process for manufacturing a piece made of composite material according to claim 1, wherein the cross-section of the plurality of pipes is inversely proportional to the pressure that is exerted.

6. The process for manufacturing a piece made of composite material according to claim 1, wherein the plurality of pipes are provided over the entire plate or only over at least one zone of the plate.

7. The process for manufacturing a piece made of composite material according to claim 1, wherein the plurality of pipes are distributed homogeneously or inhomogeneously.

8. The process for manufacturing a piece made of composite material according to claim 1, wherein the plate has a thickness that is greater or equal to approximately 10 mm.

9. The device for manufacturing a piece made of composite material according to claim 3, wherein the cross-section of the plurality of pipes is inversely proportional to the pressure that is exerted.

10. The device for manufacturing a piece made of composite material according to claim 3, wherein the plurality of pipes are provided over the entire plate or only over at least one zone of the plate.

11. The device for manufacturing a piece made of composite material according to claim 3, wherein the plurality of pipes are distributed homogeneously or inhomogeneously.

12. The device for manufacturing a piece made of composite material according to claim 3, wherein the plate has a thickness that is greater or equal to approximately 10 mm.

13. A device for manufacturing a piece made of composite material that comprises a fiber preform that is embedded in a matrix, comprising:
    a first chamber into which the preform is placed and which is delimited by a first semi-sealed wall permeable to gas and impermeable to a product that is able to form the matrix, the first semi-sealed wall comprising at least one sealed plate having a number of homogeneously or inhomogeneously tapered perforations or microperforations that empty on either side of said sealed plate, a cross section of the perforations or microperforations being adapted so that pressure being exerted on the piece does not mark the piece, the first semi-sealed wall also comprising at least one semi-sealed membrane that is superposed on said at least one plate, the semi-sealed membrane being arranged on a side of a surface of the plate opposite to a side that is in contact with the piece to be produced;

a second chamber that is delimited by a second gas-tight wall and said first semi-sealed wall; and a gas extractor configured for extracting the gases from the second chamber.

* * * * *